3,065,272
ETHYLENICALLY UNSATURATED IONIC
PHOSPHONIUM SALTS
Albert Y. Garner, John G. Abramo, and Earl C. Chapin, Springfield, Mass., assignors to Monsanto Chemical Company, St. Louis, Mo., a corporation of Delaware
No Drawing. Filed Oct. 12, 1959, Ser. No. 845,617
5 Claims. (Cl. 260—606.5)

This invention relates to novel phosphorus polymers. More particularly, it relates to novel ionic vinylidene aromatic phosphonium salts and processes for their manufacture.

The technology of polymerizable phosphorus compounds has heretofore remained relatively undeveloped. However, such materials are growing increasingly attractive for use in specialized applications wherein their novel properties may be advantageously utilized.

It is an object of this invention to provide novel phosphorus compounds.

Another object is the provision of novel polymerizable phosphorus compounds.

Another object is the provision of novel ethylenically unsaturated ionic phosphonium salts.

A further object is the provision of novel phosphorus monomers from which non-inflammable and heat-resistant polymers may be prepared.

These and other objects are attained by coreacting a nuclearly halomethylated vinylidene aromatic compound and a tertiary phosphine to form a vinylidene aromatic phosphonium halide. The halide anion of said product may be subsequently replaced with other monovalent or polyvalent anions employing ion exchange techniques.

The following examples are presented in illustration of the invention and are not intended as limitations thereof.

*Example I*

A slurry of 25 grams (about 0.1 mol) of triphenyl phosphine, 0.1 gram of tertiarybutyl catechol and 15 grams (about 0.1 mol) of p-vinylbenzyl chloride is heated, with stirring, to the melting point of the triphenyl phosphine (circa 79° C.). The reaction occurs rapidly and the reaction mixture changes into a solid mass. The product is dissolved in 250 ml. of methanol; which solution is subsequently poured into an excess of ether to precipitate crystalline solids. The precipitate is recovered by filtration and then dissolved in 100 ml. of boiling dioxane. This hot dioxane solution is cooled and then poured into an excess of ether, precipitating, in about 60% yield, white crystalline solids having a melting point of about 226–227° C. Infrared and elemental analysis establishes the product as p-vinylbenzyltriphenylphosphonium chloride.

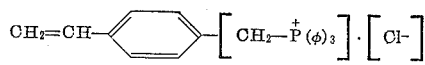

*Example II*

Eight grams (about 0.1 mol) of trimethyl phosphine are slowly added, under an inert nitrogen atmosphere, to a stirred solution of 15 grams (about 0.1 mol) of m-vinylbenzyl bromide dissolved in 100 ml. of ether. The reaction mixture is maintained at about room temperature throughout such addition. Reaction occurs rapidly to form a crystalline precipitate as the trimethyl phosphine is added. The precipitate is recovered by filtration and then recrystallized from 50 ml. of dioxane to yield a white crystalline product. Infrared and elemental analysis establishes the product as m-vinylbenzyltrimethylphosphonium bromide.

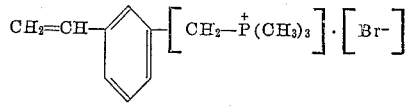

*Example III*

Twenty-one grams (about 0.1 mol) of ethyldiphenyl phosphine are slowly added, under an inert nitrogen atmosphere, to a stirred solution of 16 grams (about 0.1 mol) of p-isopropenylbenzyl chloride dissolved in 150 ml. of methanol. The reaction mixture is maintained at about room temperature throughout such addition. After all of the ethyldiphenyl phosphine has been added, the reaction mixture is poured into an excess of hexane, precipitating crystalline solids. The precipitate is recovered by filtration and then recrystallized from 50 ml. of dioxane. Infrared and elemental analysis establishes the product as p-isopropenylbenzyl ethyldiphenylphosphonium chloride.

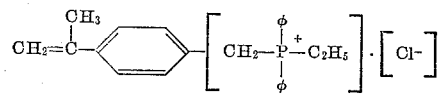

*Example IV*

Five grams of the p-vinylbenzyltriphenylphosphonium chloride obtained in Example I are dissolved in 50 ml. of methanol and 2 grams of disilver hydrogen phosphate are slurried therein. The mixture is agitated vigorously, at room temperature, for about 2 hours. Solids, i.e., silver chloride and unreacted disilver hydrogen phosphate, are removed by filtration. The clear filtrate is evaporated to a volume of about 25 ml. and then cooled to about 0° C. A white crystalline precipitate is formed, which is recovered by filtration. Infrared and elemental analysis establishes the product as di(p-vinylbenzyltriphenylphosphonium)hydrogen phosphate

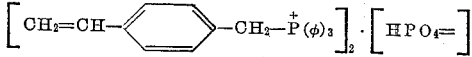

*Example V*

Ten grams of the p-vinylbenzyltriphenylphosphonium chloride obtained in Example I are dissolved in 100 ml. of methanol and then mixed with a solution of 4 grams of a silver polyacrylate, having a number average molecular weight of about 10,000, dissolved in 50 ml. of water. The mixture is allowed to stand at room temperature until the precipitation of silver chloride ceases. The precipitate is removed by filtration and the clear filtrate is evaporated to dryness under a vacuum at 40° C., yielding a tough and rigid transparent polymer. Infrared and elemental analysis reveals the presence of only a trace of chloride ion and establishes the product as a polymer comprised of p-vinylbenzyltriphenylphosphonium cations ionically bonded to polyacrylate ions. The polymer is comprised of a plurality of structural units corresponding to the formula:

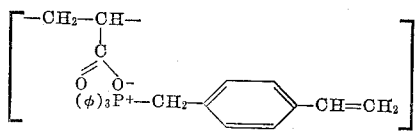

The nuclearly halomethylated vinylidene aromatic compounds employed in the practice of this invention correspond to the general formula:

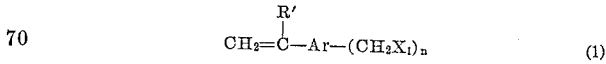

In this formula, $X_1$ represents halogen atoms and R' may be either hydrogen or methyl. Ar is a polyvalent aromatic residue containing from 6–14 carbon atoms such as, for example, phenyl, biphenyl, naphthyl, anthracyl and the alkyl substituted derivatives thereof. $n$ is an integer of from 1–3, designating the number of halomethyl groups positioned upon the aromatic nucleus. Thus, the p-vinylbenzyl chloride, m-vinylbenzyl bromide and p-isopropenylbenzyl chloride employed in the examples may be replaced, for example, with one of the following nuclearly halomethylated vinylidene aromatic compounds with equivalent results:

(a) Other monohalomethylated vinylidene aromatic compounds such as o-vinylbenzyl chloride, 1-vinyl-2-ethyl-4-chloromethyl benzene, 4-vinyl-4'-chloromethyl biphenyl, 1-vinyl-4-bromomethyl naphthalene, 1-isopropenyl-4-chloromethyl-5-methyl naphthalene, 9-vinyl-10-fluoromethyl anthracene, etc.;

(b) Di(halomethylated)vinylidene aromatic compounds such as 1-vinyl-2,4-bis(chloromethyl)benzene, 1-isopropenyl-3,5-bis(bromomethyl)benzene, 4-vinyl-2',4'-bis(fluoromethyl)-biphenyl, 1-vinyl-4,5-bis(chloromethyl)naphthalene, 1-isopropenyl-6,7-bis(iodomethyl)naphthalene, 9-vinyl-4,5-bis(chloromethyl)anthracene, etc. and (c) Tri(halomethylated)vinylidene aromatic compounds such as 1-vinyl-2,4,6-tris(chloromethyl)benzene, 1-isopropenyl-3,6,8-tris(bromomethyl)naphthalene, 9-vinyl-4,5,10-tris(chloromethyl)anthracene, etc.

The tertiary phosphines employed in the practice of this invention correspond to the general formula:

$$R-P-R \atop R \qquad (2)$$

In this formula, each R is an independently selected hydrocarbon radical containing from 1–20 carbon atoms. Thus, the triphenyl phosphine, trimethyl phosphine and ethyldiphenyl phosphine employed in the examples may be replaced, for example, with one of the following tertiary phosphines with equivalent results: trialkyl phosphines of the homologous series of from triethyl phosphine through trieicosyl phosphine, isopropyl-di-secondary-butyl phosphine, methyldieicosyl phosphine, methylethylisopropyl phosphine, cyclohexyldimethyl phosphine, etc.; triaryl phosphines such as trinaphthyl phosphine, naphthyldiphenyl phosphine, etc.; trialkylaryl phosphines such as phenyldimethyl phosphine, methyldiphenyl phosphine, cyclohexyldiphenyl phosphine, etc.; etc.

In preparing the ionic vinylidene aromatic phosphonium halides of this invention, substantially equivalent proportions of the nuclearly halomethylated vinylidene aromatic compound and the tertiary phosphine are reacted. For the purposes of this discussion the term "equivalent proportions" relates to substantial equality between the halogen groups of the nuclearly halomethylated vinylidene aromatic compound and the phosphorus of the tertiary phosphine. It has been found that reaction occurs substantially immediately at temperatures of from about 0 to 150° C. depending upon the particular reactants employed. If desired, the reaction may be effected in a polar solvent such as methanol, ethanol, dimethylformamide, acetonitrile, tetramethylene sulfane, nitrobenzene, etc. However, in the absence of a polar solvent, the reaction should be effected at a temperature above the melting point of the highest melting component but below the boiling point of the lowest boiling component. Although not necessary, it may be advantageous to effect the reaction in the presence of minor proportions of conventional polymerization inhibitors such as tertiarybutyl catechol, phenylenediamine, ditertiarybutylparacresol, etc.; especially in conjunction with elevated reaction temperatures. Conventional techniques, e.g., extraction, distillation, precipitation, crystallization, etc., may be employed to recover the monomeric halide products. When polar solvents are employed the monomeric halide produced may be soluble in the particular solvent chosen. In this event, the product may be recovered by pouring the solution into an excess of a non-polar solvent or a solvent of low polarity; e.g., hexane, ether, etc.

The ionic vinylidene aromatic phosphonium halides obtained in this reaction, supra, correspond to the general formula:

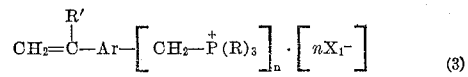

(3)

In this formula R, R', Ar, $X_1$ and $n$ are radicals and integers as heretofore described. These monomers form a preferred embodiment of this invention.

In another embodiment of this invention, the ionic vinylidene aromatic phosphonium halides described above are converted into salts of other mono- or poly-valent anions; which salts correspond to the general formula:

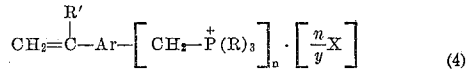

(4)

In this latter formula R, R', Ar and $n$ are radicals and integers as heretofore described. However X is a mono- or poly-valent inorganic or organic anion as hereinafter disclosed. The anions, X, are ionically bonded to the phosphorus atoms of the vinylidene aromatic phosphonium cation. Since these salts are in ionic balance, the number of positive and negative charges of the salt must be equal. Thus, since the number of positive charges on the vinylidene aromatic phosphonium cation is numerically equal to $n$, the number of anionic radicals necessary to satisfy these positive charges can be computed from the ratio:

$$n/y$$

where $y$ is an integer numerically equivalent to the valency of the associated anion. Thus, these latter salts may be, in various embodiments; simple salts containing one or more vinylidene aromatic phosphonium cation per anion, depending upon the valency of the anion, or, alternatively, one or more anion per vinylidene aromatic phosphonium cation, depending upon the magnitude of the integer $n$. When both the vinylidene aromatic phosphonium cation and the anion associated therewith are polyvalent, a wide variety of linear, or cross-linked, ionically-bonded, ethylenically unsaturated polymers of varying size can be produced. In a preferred variation of this embodiment, the anion employed may itself be polymeric and have a large plurality of ionizable substituent groups. In such case $y$ is equal to the cumulative valency of such dissociated substituent groups. The product resulting would be an ionic polymer containing ethylenically unsaturated aromatic appendages.

Desired ionic vinylidene aromatic phosphonium salts of this latter embodiment may be prepared by dissolving the corresponding ionic vinylidene aromatic phosphonium halide in one of the aforementioned polar solvents and subsequently combining such solution with an aqueous solution containing at least an equivalent proportion of the replacement anionic radicals. In a preferred embodiment, a silver, or other cation which forms an insoluble halide salt, salt of the replacement anion is employed. The precipitated halide salt is separated, e.g., by filtration and the ionic vinylidene aromatic phosphonium salt recovered from the filtrate employing conventional techniques, e.g., evaporation, recrystallization, etc. However, in many instances, the same result can be achieved by careful selection of the polar solvent so as to effect the preferential precipitation of the desired phosphonium salt. In this connection it may be necessary to add a third, carefully selected, solvent, usually non-polar, to effect the precipitation. In other instances it may be desirable to employ hot solvents and fractional precipitation techniques to separate the desired salt. After washing the ionic vinylidene aromatic phosphonium salt to remove any residual solvent and free anions, it has been found that only trace quantities of the original halide anion remain.

This invention is not limited in the range of the anionic radicals which may be employed to replace the halide anions of the ionic vinylidene aromatic phosphonium halides. Since a dissimilar halide ion may be so employed, the general anionic radical designated as X in the foregoing Formula 4 encompasses the halide radicals, $X_1$. In various other embodiments, the anionic radical X may be, for example, a phosphate, sulfate, carbonate, thiocyanate, iodide, salicilate, chromate, dihydrogen phosphate, phosphite, acid phthalate, hydroxyl, permanganate, iodate, molybdate, octa-molybdate, nitrate, sulfide, sulfite, p-toluenesulfonate, acetylsalicylate, bichromite, picrate, etc., anion. Polymeric anions such as, for example, polyacrylate, ethylene-maleate copolymer, polyvinylpyrrolidone, etc., anions may also be employed. These polymeric anions may have molecular weights ranging from about 200 to 1,000,000, as determined by the number average method. In general, water soluble salts of the anions are employed.

The ionic vinylidene aromatic phosphonium salts of this invention are generally crystalline solids exhibiting a wide variety of colors depending upon the chromatic effect, if any, of the particular anion present. Most of these products are at least partially soluble in one or more polar solvents. They are useful as anion exchange compositions and scavengers in various applications such as water purification. They may also be employed as intermediates in the preparation of other vinylidene aromatic phosphorus compounds. However, their preferred utility is as monomers in the preparation of novel linear and cross-linked polymers. Such polymers may also be used as ion exchange resins and sequestering agents as well as temperature resistant laminates, non-inflammable moldings and extrusions.

*Example VI*

Ten grams of the p-vinylbenzyltriphenylphosphonium chloride obtained in Example I and 0.1 gram of azobisisobutyronitrile are dissolved in 100 ml. of methanol and charged to a stirred reactor under a nitrogen atmosphere. The mixture is heated at 85° C. for about 40 hours and the solids obtained are dissolved in 150 ml. of acetone. This solution is subsequently poured into an excess of ether to precipitate a clear, glass-like solid polymer having a softening point of about 212–216° C. Upon testing for flammability by holding a lump of the polymer in the flame of a Meeker burner until it ignites, the polymer is found to be self-extinguishing.

It is obvious that many variations may be made in the products and processes herein set forth without departing from the spirit and scope of this invention.

What is claimed is:
1. An ethylenically unsaturated ionic phosphonium salt corresponding to the general formula:

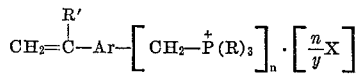

wherein each R is an independently selected hydrocarbon radical free of acetylenic and ethylenic unsaturation containing from 1–20 carbon atoms, R' is a radical selected from the group consisting of hydrogen and methyl, n is an integer of from 1–3, Ar is a polyvalent aromatic hydrocarbon residue free of acetylenic and ethylenic unsaturation containing from 6–14 carbon atoms and having a valency equal to $n+1$, X is an anion selected from the group consisting of mono- and poly-valent inorganic and organic anions and y is an integer numerically equal to the valency of X; $n/y$ being the number of X anions required to satisfy the positive charge of the phosphonium cation.

2. An ethylenically unsaturated ionic phosphonium salt as in claim 1 wherein R' is hydrogen and each R is a phenyl radical.

3. An ethylenically unsaturated ionic phosphonium salt as in claim 1 wherein X is a halogen anion.

4. A process for preparing an ethylenically unsaturated ionic phosphonium salt corresponding to the general formula:

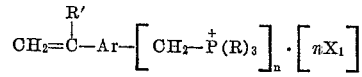

which comprises heating a mixture of (a) one molar proportion of a nuclearly halomethylated vinylidene aromatic compound corresponding to the general formula:

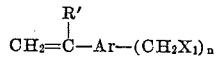

and (b) approximately n molar proportions of a tertiary phosphine corresponding to the general formula:

wherein, each of the above formulae, each R is an independently selected hydrocarbon radical free of acetylenic and ethylenic unsaturation containing from 1–20 carbon atoms, R' is a radical selected from the group consisting of hydrogen and methyl, n is an integer of from 1–3, Ar is a polyvalent aromatic hydrocarbon residue free of acetylenic and ethylenic unsaturation containing from 6–14 carbon atoms and having a valency equal to $n+1$ and $X_1$ is a halogen anion.

5. A process for preparing an ethylenically unsaturated ionic phosphonium salt corresponding to the general formula:

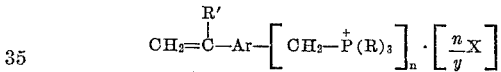

which comprises (a) heating a mixture of (1) one molar proportion of a nuclearly halomethylated vinylidene aromatic compound corresponding to the general formula:

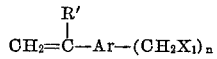

and (2) approximately n molar proportions of a tertiary phosphine corresponding to the general formula:

to form an ethylenically unsaturated ionic phosphonium halide corresponding to the general formula:

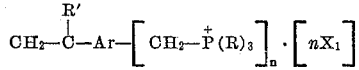

(b) dissolving said ethylenically unsaturated ionic phosphonium halide in a polar solvent and (c) mixing the resulting solution with an aqueous solution containing at least a stoichiometric proportion of anionic radicals corresponding to the general formula: X; wherein, in each of the above formulae, each R is an independently selected hydrocarbon radical free of acetylenic and ethylenic unsaturation containing from 1–20 carbon atoms, R' is a radical selected from the group consisting of hydrogen and methyl, n is an integer of from 1–3, Ar is a polyvalent aromatic hydrocarbon residue free of acetylenic and ethylenic unsaturation containing from 6–14 carbon atoms and having a valency equal to $n+1$, $X_1$ is a halogen anion, X is an anion selected from the group consisting of mono- and poly-valent inorganic and organic anions and y is an integer numerically equal to the valency of X; $n/y$ being the number of X anions required to satisfy the positive charge of the phosphonium cation.

No references cited.